United States Patent
Bajpai et al.

(10) Patent No.: US 8,295,878 B2
(45) Date of Patent: *Oct. 23, 2012

(54) SINGLE NUMBER PRESENTATION FOR DUAL-MODE PHONES

(75) Inventors: Rajneesh Bajpai, San Jose, CA (US); Deepinder Setia, San Ramon, CA (US); Pradeep Iyer, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,324

(22) Filed: Jul. 26, 2011

(65) Prior Publication Data

US 2011/0281549 A1 Nov. 17, 2011

Related U.S. Application Data

(63) Continuation of application No. 11/955,104, filed on Dec. 12, 2007, now Pat. No. 8,000,739.

(51) Int. Cl.
 *H04B 1/38* (2006.01)
 *H04M 1/00* (2006.01)
(52) U.S. Cl. .......... 455/552.1; 455/415; 455/554.1; 455/555
(58) Field of Classification Search ........... 455/552.1, 455/555, 415, 554.1, 426.1, 426.2, 414.1, 455/432.1, 411, 556.1, 417, 446, 422.1, 554.2; 370/331
See application file for complete search history.

(56) References Cited

U.S. PATENT DOCUMENTS

| | | | |
|---|---|---|---|
| 6,445,921 B1 * | 9/2002 | Bell | 455/426.1 |
| 6,614,786 B1 * | 9/2003 | Byers | 370/353 |
| 6,975,602 B2 | 12/2005 | Anderson | |
| 7,035,260 B1 | 4/2006 | Betta | |
| 7,308,263 B2 | 12/2007 | Gallagher et al. | |
| 7,414,992 B2 * | 8/2008 | Hirsbrunner et al. | 370/331 |
| 7,492,872 B1 | 2/2009 | Di Carlo | |
| 7,565,145 B2 | 7/2009 | Gallagher et al. | |
| 7,606,190 B2 | 10/2009 | Markovic et al. | |
| 7,768,977 B2 | 8/2010 | Camp, Jr. | |
| 7,826,868 B2 | 11/2010 | Robbins | |
| 2002/0111198 A1 | 8/2002 | Heie | |
| 2002/0132638 A1 | 9/2002 | Plahte et al. | |
| 2003/0139180 A1 | 7/2003 | McIntosh et al. | |
| 2004/0033811 A1 | 2/2004 | Tsai et al. | |
| 2004/0264410 A1 | 12/2004 | Sagi et al. | |

(Continued)

OTHER PUBLICATIONS

United States Office Action dated Mar. 2, 2011 for U.S. Appl. No. 12/168,756, filed on Jul. 7, 2008 entitled Enterprise Seamless Mobility.

(Continued)

*Primary Examiner* — John J Lee
(74) *Attorney, Agent, or Firm* — Blakely, Sokoloff, Taylor & Zafman LLP

(57) ABSTRACT

Providing a single number presentation to the party called by a dual-mode phone. The operation of the cellular side of a dual-mode phone is altered such that when the user attempts to place an outgoing call using the cellular phone, the call is redirected to a preprogrammed incoming phone number associated with the enterprise. When the enterprise PBX answers this call, the dual-mode phone transmits the desired number to the enterprise PBX. The enterprise PBX then places the call to the desired number, and in the process transmits the caller-id information assigned to the dual-mode phone.

24 Claims, 1 Drawing Sheet

U.S. PATENT DOCUMENTS

| | | | |
|---|---|---|---|
| 2006/0023658 | A1 | 2/2006 | Phillips et al. |
| 2006/0058050 | A1 | 3/2006 | Park |
| 2006/0223555 | A1 | 10/2006 | Kim |
| 2006/0239277 | A1 | 10/2006 | Gallagher |
| 2007/0014260 | A1* | 1/2007 | Seo .............................. 370/331 |
| 2007/0149176 | A1 | 6/2007 | Wells et al. |
| 2007/0165825 | A1 | 7/2007 | Ko et al. |
| 2007/0207804 | A1 | 9/2007 | Sharma et al. |
| 2007/0268858 | A1 | 11/2007 | Soto |
| 2007/0281682 | A1 | 12/2007 | Raju et al. |
| 2008/0002605 | A1 | 1/2008 | Todd et al. |
| 2008/0085728 | A1 | 4/2008 | Reding |
| 2008/0112392 | A1 | 5/2008 | Mansfield |
| 2010/0105379 | A1 | 4/2010 | Bonner et al. |

OTHER PUBLICATIONS

United States Office Action dated Apr. 26, 2011 for U.S. Appl. No. 11/963,275, filed on Dec. 12, 2007 entitled Indicators for Dual Mode Phones.

United States Office Action dated Mar. 23, 2011 for U.S. Appl. No. 11/955,108, filed on Dec. 12, 2007 entitled Delayed Ack in Dual-Mode Call Handover.

United States Office Action dated Mar. 29, 2011 for U.S. Appl. No. 11/955,091, filed on Dec. 12, 2007 entitled Single Voicemail for Dual-Mode Phones.

United States Office Action dated Sep. 30, 2010 for U.S. Appl. No. 11/955,108, filed on Dec. 12, 2007 entitled Delayed Ack in Dual-Mode Call Handover.

United States Office Action dated Oct. 5, 2010 for U.S. Appl. No. 11/955,091, filed on Dec. 12, 2007 entitled Single Voicemail for Dual-Mode Phones.

United States Office Action dated Nov. 15, 2010 for U.S. Appl. No. 11/963,275, filed on Dec. 12, 2007 entitled Indicators for Dual Mode Phones.

H. Schulzrinne et al., "RTP Payload for DTMF Digits, Telephony Tones and Telephony Signals", Network Working Group, May 2000, 1-30.

R. Many et al., "AMessage Summary and Message Waiting Indication Event Package for the Session Initiation Protocol (SIP)", Network Working Group, Aug. 2004, 1-19.

S. Bellovin et al., "Security Mechanisms for the Internet", Network Working Group, Dec. 2003, 1-20.

H. Schulzrinne et al., "RTP: A Transport Protocol for Real-Time Applications", Network Working Group, Jul. 2003, 1-89.

J. Rosenberg et al., "SIP: Session Initiation Protocol", Network Working Group, Jun. 2002, 1-269.

United States Office Action dated Jun. 17, 2010 for U.S. Appl. No. 11/955,104, filed on Dec. 12, 2007 entitled Single Number Presentation for Dual-Mode Phones.

United States Office Action dated Dec. 6, 2010 for U.S. Appl. No. 11/955,104, filed on Dec. 12, 2007 entitled Single Number Presentation for Dual-Mode Phones.

United States Office Action dated Oct. 25, 2011 for U.S. Appl. No. 11/955,108, filed on Dec. 12, 2007 entitled Indicators for Dual Mode Phones.

United States Office Action dated Mar. 2, 2011 for U.S. Appl. No. 12/168,756.

United States Office Action dated Nov. 22, 2011 for U.S. Appl. No. 12/168,756.

Office Action for U.S. Appl. No. 11/963,275, Filed Dec. 21, 2007 mailed Jul. 6, 2012.

* cited by examiner

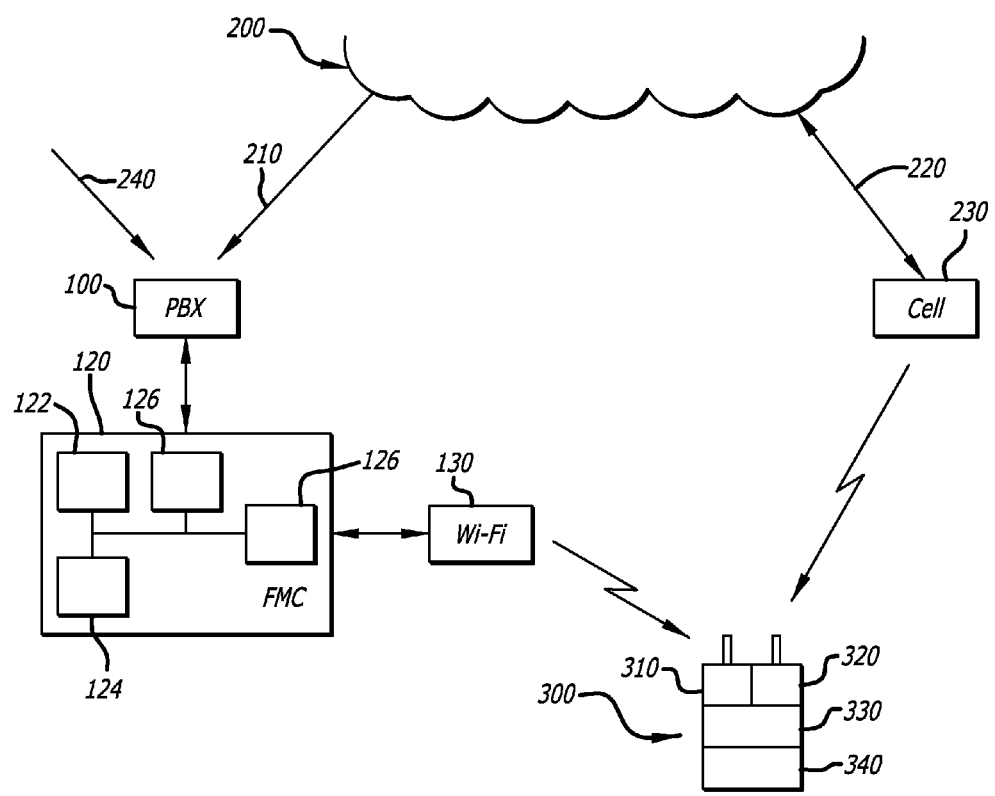

SINGLE NUMBER PRESENTATION FOR DUAL-MODE PHONES

CROSS REFERENCE TO RELATED APPLICATIONS

This application is a continuation of U.S. patent application Ser. No. 11/955,104, filed on Dec. 12, 2007 now U.S. Pat. No. 8,000,739.

BACKGROUND OF THE INVENTION

The present invention relates to the operation of dual-mode phones, and more particularly, to presenting a single number to the party called by a dual-mode phone.

Dual-mode phones support connections via Wi-Fi and cellular networks. In an enterprise environment, when the user of a dual-mode phone places a call through the enterprise Wi-Fi connection, the called party receives caller-id information from the enterprise. When the user of the dual-mode phone is away from the enterprise Wi-Fi network and places a call through the cellular side of the dual-mode phone, the called party receives completely different caller-id information.

BRIEF DESCRIPTION OF THE DRAWINGS

The invention may be best understood by referring to the following description and accompanying drawings that are used to illustrate embodiments of the invention in which:

FIG. 1 shows a dual-mode phone in a network.

DETAILED DESCRIPTION

Embodiments of the invention relate to dual-mode phones, and to providing a single number presentation to the party called by a dual-mode phone. The operation of the cellular side of a dual-mode phone is altered such that when the user attempts to place an outgoing call using the cellular phone, the call is redirected to a preprogrammed incoming phone number associated with the enterprise. When the enterprise PBX answers this call, the dual-mode phone transmits the desired number to the enterprise PBX. The enterprise PBX then places the call to the desired number, and in the process transmits the enterprise caller-id information assigned to the dual-mode phone.

FIG. 1 shows an embodiment of the invention including a dual-mode phone. Enterprise SIP PBX communicates 210 with public switched telephone network (PSTN) 200. SIP PBX 100 also communicates with fixed mobility controller (FMC) 120. Mobility controller 120 bridges the worlds of SIP PBX 100 and Wi-Fi network controller 130. SIP PBX 100 and fixed mobility controller 120 communicate for example using protocols established by RFC 3261, RFC 2833, and RFC 3631, incorporated herein by reference. Voice streams are typically encoded using the RTP protocols defined by RFC 3550, incorporated herein by reference.

As understood in the art, such a hardware platform as shown in FIG. 1 for hosting mobility controller 120 includes a central processing unit (CPU) 122 connected to memory hierarchy 124, and to one or more interfaces 126. In one embodiment, CPU 122 is a MIPS-style CPU such as those from Raza Microelectronics or Cavium Networks, although CPUs from other companies such as Intel, AMD, Freescale, or the like may also be used. Memory hierarchy 124 includes read-only memory for system initialization, high-speed read-write memory such as DRAM, and bulk memory such as a hard disk or compact flash storage for files. Interfaces 126 include wired and wireless Ethernet interfaces as are known to the art. Controller 120 typically operates under the control of an operating system such as Linux, hosting software processes which provide device functionality. Additional hardware may be provided to provide for high-speed packet handling, crypto processing, and the like. While FIG. 1 shows mobility controller 120 and Wi-Fi-network controller 130 as separate entities, it should be noted that they may also be software processes running on a shared hardware platform. As an example, a single hardware platform based on a multi-core MIPS processor such as those from Raza Microelectronics or Cavium Networks could host the functions of Wi-Fi network controller 130 along with mobility controller 120 and additional functions such as intrusion detection and/or firewalls.

Dual-mode phone 300 has first radio subsystem 310 for Wi-Fi communications such as to Wi-Fi network controller 130. Dual-mode phone 300 also has second radio subsystem 320 for communicating with cellular network 230 and through public switched telephone network 200. As is common with many such devices, dual-mode phone 300 is a digital device operating under control of CPU 330 through programs and data stored in memory hierarchy 340. Other aspects of dual-mode phone 300 such as speakers, microphones, power and display, keyboards and the like are understood by those in the art, and are not shown.

In operation, when dual-mode phone 300 wishes to initiate a call through Wi-Fi connection 310, mobility controller 120 through Wi-Fi network controller 130 signals PBX 100 to place the call through public switched telephone network 200. In so doing, PBX 100 provides the enterprise caller-id information associated with dual-mode phone 300 to PSTN 200 and the called party.

When dual-mode phone 300 is out of range of the enterprise Wi-Fi network and places a call using the cellular 320 side, through cellular network 230, the caller-id information received by the called party will be that provided by the cellular network. According to an embodiment of the present invention, dual-mode phone 300 is modified such that when the user attempts to place a call using cellular network 230, the destination number is stored temporarily in memory hierarchy 340. A cellular call is then placed to a predetermined number assigned to enterprise PBX 210. When this call is received at PBX 100, it also receives caller-id information identifying and authenticating dual-mode phone 300. If the caller-id information indicates that the incoming call is from an authorized user, such as by comparing the caller-id information to a list of allowed numbers, the incoming call is routed to mobility controller 120, which has previously been registered with PBX 100 as a SIP back to back user agent (B2BUA) as described in RFC 3261, incorporated herein by reference.

When the call from dual-mode phone 300 is passed to mobility controller 120, the controller receives the incoming caller-id information (the cellular number of the dual-mode phone) identifying dual-mode phone 300, and then receives the destination (called party) number information as transmitted by dual-mode phone 300. This destination number can be transmitted by dual-mode phone 300, for example, using DTMF tones, and received by mobility controller 120 using packetized DTMF tones as described in RFC 2833 incorporated herein by reference. Mobility controller 120 then uses this number to initiate a PSTN call through SIP PBX 100, retrieving and using the enterprise caller-id information associated with dual-mode phone 300. When that outgoing call is established, mobility controller 120 connects the incoming cellular call from dual-mode phone 300 to the outgoing call just established, thus providing the destination number with the enterprise called-id information.

It may be desirable to place certain cellular calls directly, such as to emergency services (911), information services, and the like. Such numbers may be recognized by the software operating dual-mode phone 300, as with 911 or other emergency services numbers, or a prefix may be provided to direct the software in dual-mode phone 300 that the number should be called directly, and not rerouted.

In additional embodiments of the invention, various techniques may be used to frame or encode the destination number to provide for robust transmission and/or error detection. In one example, the digit sequence may be framed by transmitting "#<number of digits>*<digit sequence>#" from dual-mode phone 300 to mobile controller 120. Other techniques such as the use of check digits or repeating digits may also be used. Dual-mode phone 300 may also repeat the transmission of the digit sequence, which may include framing or check digits as discussed. Authentication codes may also be added or included in the check sequence. The digit sequence may be repeated a specified number of times, or for a predetermined period of time.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. Adapted for communications with a private branch exchange (PBX) deployed within an enterprise network, a mobility controller comprising:
    means for receiving an incoming caller-id information for a dual-mode phone initiating a telephone call to the PBX;
    means for receiving a telephone number from the dual-mode phone, the telephone number corresponding to a destination number for the telephone call;
    means for retrieving an outgoing caller-id information for the dual-mode phone;
    means for initiating a public switched telephone network (PSTN) call using the telephone number while providing the outgoing caller-id information; and
    means for connecting the PSTN call with the received telephone call from the dual-mode phone.

2. A dual-mode phone comprising:
    a first radio subsystem adapted to initiate a telephone call to a called party over a wireless network;
    a second radio subsystem adapted to initiate a call over a cellular network, where
    in response to an attempt to place the call using the cellular network, the dual-mode phone (i) storing a phone number being a destination for the call, (ii) initiating a call to a predetermined number assigned to a device forming part of the wireless network in lieu of initiating the call over the cellular network, (iii) and providing the stored phone number and an incoming caller-id information of the dual-mode phone so that a telephone call to the destination including an outgoing caller-id information that corresponds to the incoming caller-id information is initiated after the calling party is authenticated using the incoming caller-id information.

3. The method of claim 2 wherein the incoming caller-id information for the dual-mode phone being a cellular telephone number for the dual-mode phone.

4. The method of claim 2 wherein the outgoing caller-id information is different than the incoming caller-id information.

5. The method of claim 2 wherein the second radio subsystem is further adapted to detect an attempt to place a call to a phone number assigned for emergency services over the cellular network, and initiating a cellular connection using the phone number assigned for emergency services in lieu of routing the call to the wireless network.

6. The method of claim 2 wherein the second radio subsystem is further adapted to detect an attempt to place a call to a phone number assigned for information services over the cellular network, and initiating a cellular connection using the phone number assigned for information services in lieu of routing the call to the wireless network.

7. A method comprising:
    receiving, at a network device, a target number through a first call from a dual-mode phone;
    retrieving, by the network device, incoming caller-identifier information associated with the dual-mode phone;
    determining, by the network device, outgoing caller-identifier information associated with the dual-mode phone based on the incoming caller-identifier information;
    initiating, by the network device, a second call to the target number using the outgoing caller-identifier information associated with the dual-mode phone; and
    establishing, by the network device, an audio connection between the first call and the second call.

8. The method of claim 7, wherein the first call is initiated to place a call through a cellular connection to the target number, and wherein a cellular connection to a predetermined number is established in lieu of the target number, the predetermined number being different than the target number and assigned to a private branch exchange that is part of the wireless local area network.

9. The method of claim 8, wherein the received target number comprises encoded digits.

10. The method of claim 9, wherein the encoded digits are generated through one or more of:
    adding framing;
    adding check digits;
    repeating digits; and
    adding authentication.

11. The method of claim 7, wherein the target number is repeatedly received at the network device for a preset number of times.

12. The method of claim 7, wherein the target number is repeatedly received at the network device for a preset period of time.

13. The method of claim 7, wherein determining the outgoing caller-identifier information comprises:
    retrieving the incoming caller-identifier information associated with the first call from the dual-mode phone, and
    comparing the incoming caller-identifier information against a list of authorized numbers.

14. The method of claim 7, further comprising:
    determining if the target number is a specific number; and
    initiating the cellular connection using the target number in response to the target number being identical to the specific number.

15. The method of claim 14, wherein the specific number comprises at least one of:
    a telephone number for emergency services; and
    a telephone number for information services.

16. A network device comprising:
    a processor;
    a memory;

a receiving mechanism operating with the processor, the receiving mechanism to receive a target number through a first call from a dual-mode phone;

a retrieving mechanism operating with the processor, the retrieving mechanism to retrieve incoming caller-identifier information associated with the dual-mode phone;

a determining mechanism operating with the processor, the determining mechanism to determine outgoing caller-identifier information associated with the dual-mode phone based on the incoming caller-identifier information;

an initiating mechanism operating with the processor, the initiating mechanism to a second call to the target number using the outgoing caller-identifier information associated with the dual-mode phone; and an establishing mechanism operating with the processor, the establishing mechanism to establish an audio connection between the first call and the second call.

17. The network device of claim 16, wherein the first call is initiated to place a call through a cellular connection to the target number, and wherein a cellular connection to a predetermined number is established in lieu of the target number, the predetermined number being different than the target number and assigned to a private branch exchange that is part of the wireless local area network.

18. The network device of claim 17, wherein the received target number comprises encoded digits.

19. The network device of claim 18, wherein the encoded digits are generated through one or more of:
adding framing;
adding check digits;
repeating digits; and
adding authentication.

20. The network device of claim 16, wherein the target number is repeatedly received at the network device for a preset number of times.

21. The network device of claim 16, wherein the target number is repeatedly received at the network device for a preset period of time.

22. The network device of claim 16, wherein the determining mechanism further to:
retrieve the incoming caller-identifier information associated with the incoming call from the dual-mode phone, and
compare the incoming caller-identifier information against a list of authorized numbers.

23. The network device of claim 16, further comprising:
a second determining mechanism operating with the processor, the second determining mechanism to determine if the target number is a specific number; and
an initiating mechanism operating with the processor, the initiating mechanism to initiate the cellular connection using the target number in response to the target number being identical to the specific number.

24. The network device of claim 23, wherein the specific number comprises at least one of:
a telephone number for emergency services; and
a telephone number for information services.

* * * * *